Oct. 26, 1954 M. S. BALLUTEEN Re. 23,887

COOKING MACHINE AND METHOD

Original Filed Oct. 19, 1950 5 Sheets-Sheet 1

INVENTOR.
MUSA S. BALLUTEEN
BY
Kenyon & Kenyon
ATTORNEYS

COOKING MACHINE AND METHOD

Original Filed Oct. 19, 1950 5 Sheets-Sheet 2

INVENTOR.
MUSA S. BALLUTEEN
BY
Kenyon & Kenyon
ATTORNEYS

COOKING MACHINE AND METHOD

Original Filed Oct. 19, 1950 5 Sheets-Sheet 3

INVENTOR.
MUSA S. BALLUTEEN
BY
Kenyon & Kenyon
ATTORNEYS

INVENTOR.
MUSA S. BALLUTEEN
BY
Kenyon & Kenyon
ATTORNEYS

COOKING MACHINE AND METHOD

Original Filed Oct. 19, 1950 5 Sheets-Sheet 5

INVENTOR.
MUSA S. BALLUTEEN
BY
Kenyon & Kenyon
ATTORNEYS

Reissued Oct. 26, 1954

Re. 23,887

UNITED STATES PATENT OFFICE 23,887

COOKING MACHINE AND METHOD

Musa S. Balluteen, Brooklyn, N. Y.

Original No. 2,643,603, dated June 30, 1953, Serial No. 191,070, October 19, 1950. Application for reissue May 19, 1954, Serial No. 431,016

12 Claims. (Cl. 99—404)

Matter enclosed in heavy brackets [ ] appears in the original patent but forms no part of this reissue specification; matter printed in italics indicates the additions made by reissue.

While useful for many related applications, the present invention is particularly advantageous as applied to oil-immersion cooking (frying) machines, and is especially intended for use under conditions requiring uniform sanitary and economic cooking of large or occasional quantities of food with minimum operator attention, such as in restaurant, institutional or even domestic installations. It has for a principal object the provision of a structurally and operationally simple machine which, because essentially automatic from beginning to end of the cooking operation, will require only a very minimum of attention by operating personnel and which, for the same reason, will insure consistently uniform high-quality cooking by eliminating numerous factors tending in conventional practice to impair quality, for example, by the highly important elimination of varations in cooking time and temperature, by minimizing oil absorption in the food, and by improvement of other and like factors, whether attributable to lack of skill or proper attention on the part of the operating personnel or to mechanical shortcomings of apparatus. To all of these ends, it contemplates the provision of one or more of the following features:

(1) Features insuring that the food will automatically be removed from the oil bath after a predeterminable cooking time therein;

(2) Features providing for the timed mechanical insertion of the uncooked or partially cooked food into a substantially constant temperature oil bath and the automatic mechanical removal of the cooked food therefrom after elapse of a predetermined time following the mechanical insertion;

(3) Features preventing the insertion of uncooked food charges in quantities large enough to effect a substantial lowering of the oil temperature in the immediate vicinity of the food—this in order to prevent the observed phenomenon that the foods will undesirably soak up a quantity of oil during such periods when the temperature of the surrounding oil is below the normal cooking temperature;

(4) Features adapted to optimum sanitation, such as simple structural features permitting quick and easy disassembly of and access to the various parts for cleaning, cleaning not only being highly essential with machines of the type involved for compliance with public health regulations but also in order to minimize rancidity or other deterioration of oil;

(5) Features providing in general an optimum structural and operational simplicity not only for the purposes of economy but also in order to minimize the necessity of repair and servicing;

(6) Features minimizing the deterioration of oil by burning, i. e., an oil heater structure of such size and construction as to minimize its operating temperature to such extent that there are substantially no local high temperature points at which the oil might be locally burned and thereby deteriorated as is the case with conventional practices.

The full nature of the invention, together with further objects and the advantages thereof may better be understood by reference to the following description of one illustrative cooking machine embodying it, the machine being shown graphically in the annexed drawings in which.

Figure 1:
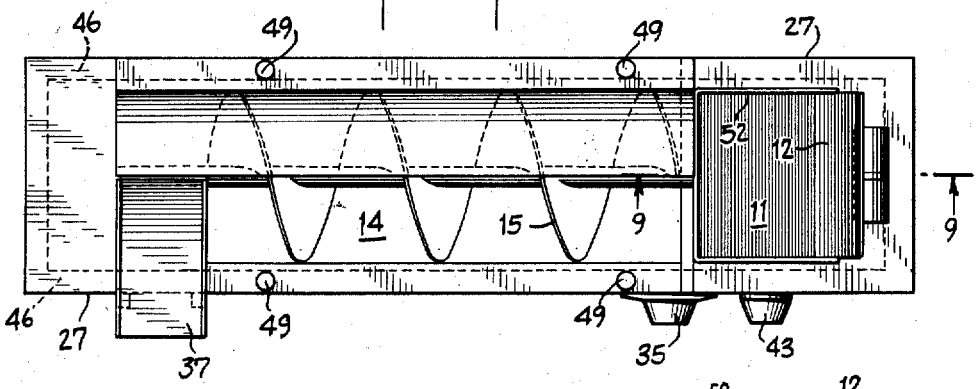
Figs. 1, 2 and 3 are top, front and rear side elevations respectively.
Figure 2:
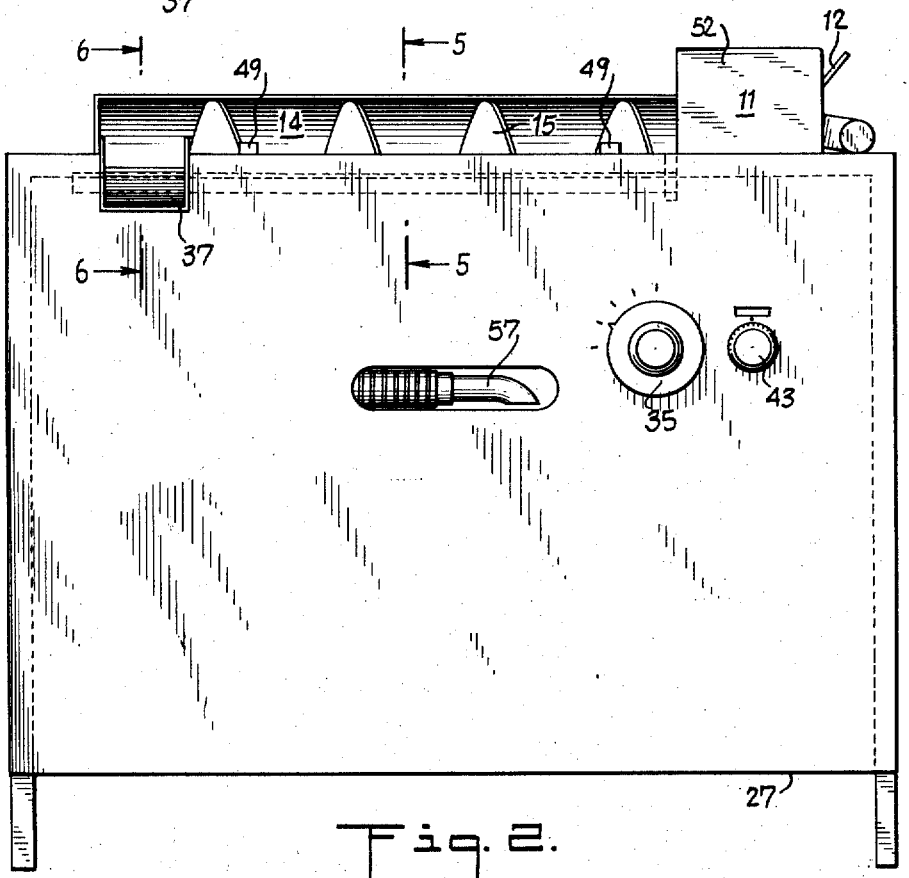
Figure 5:
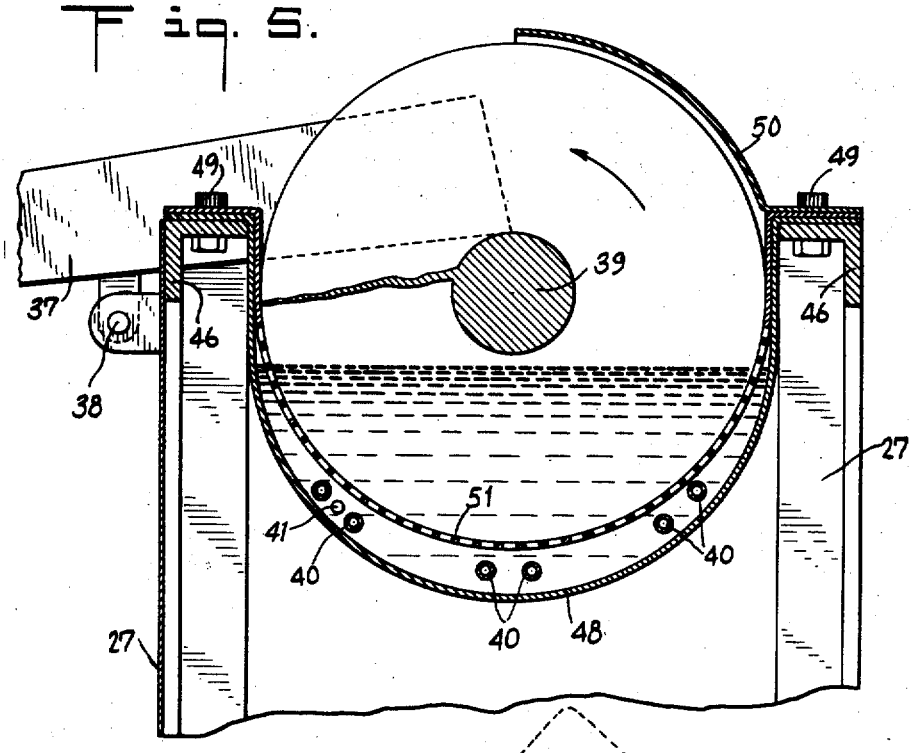
Figure 6:
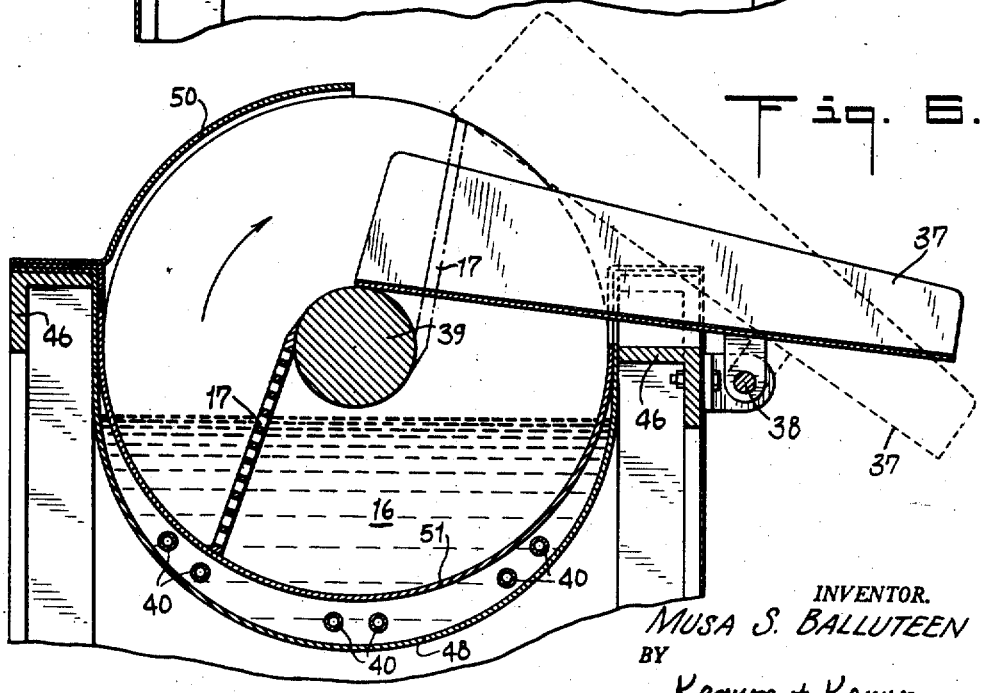
Figure 7:
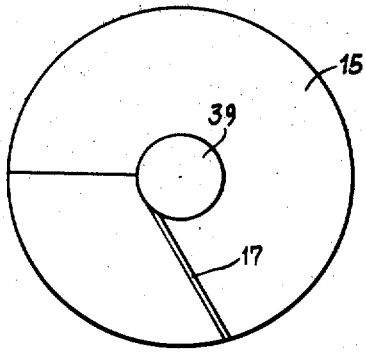
Figure 8:
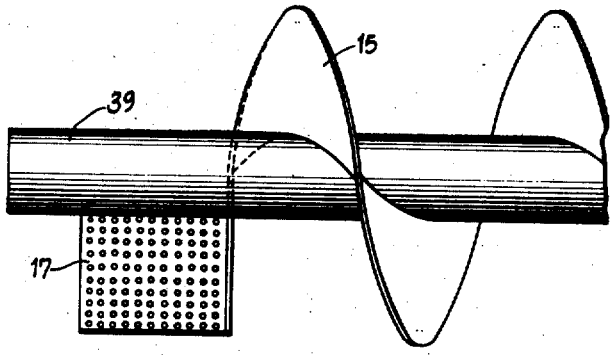
Figure 9:
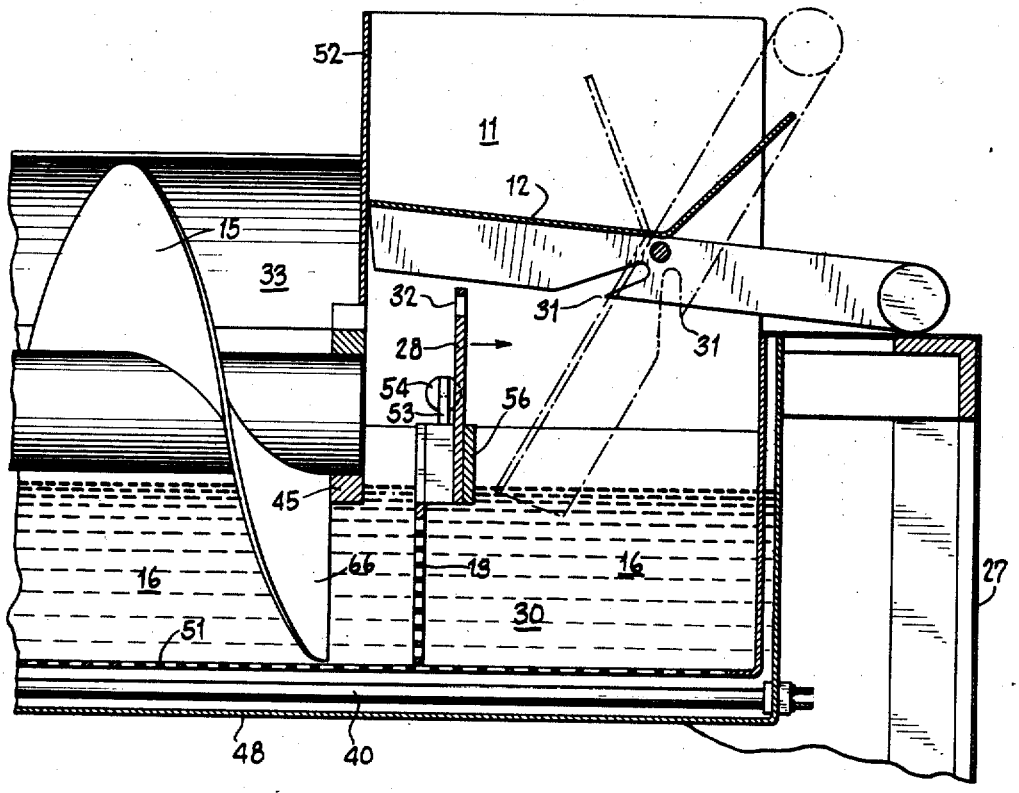
Figure 10:
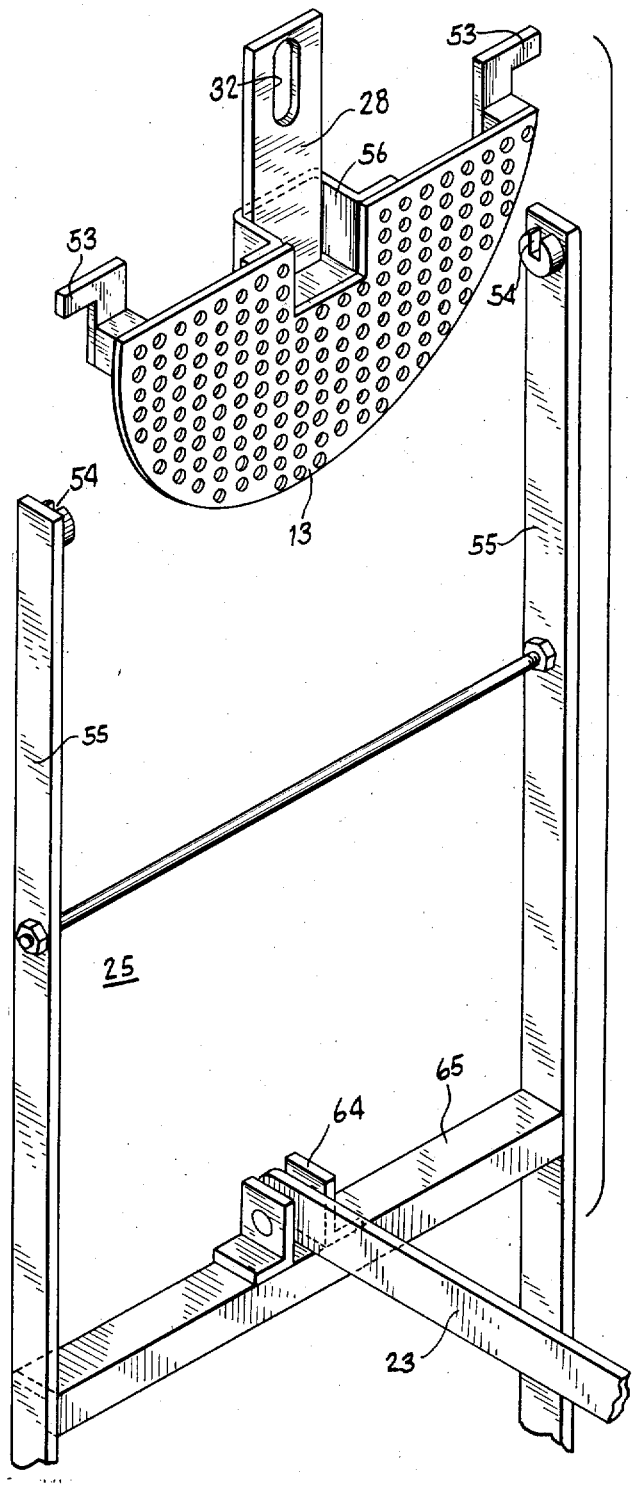

Figs. 5 and 6 are respectively vertical sections extending from front to rear along lines 5—5 and 6—6 of Fig. 2;

Figs. 7 and 8 are end and side elevations of the helicoid conveyor and attached lifter;

Fig. 9 is a vertical section extending lengthwise of the machine along the line 9—9 of Fig. 1 and showing essentially the feeder assembly; and Fig. 10 is an exploded view of parts of the linkage for operating the feeder assembly.

Referring particularly to Figs. 1, 2, 3 and 9 of the drawings, the illustrative machine comprises as principal elements a feeder assembly 11 including a periodically operated trap door-like feeder plate or chute 12 and a reciprocatable pusher plate 13 (Figs. 9 and 10); a conveyor assembly 14 comprising the helicoid conveyor 15 rotating in an oil bath 16, and a lifter plate or ejector scoop 17; and a drive assembly 18 for operating the feeder, pusher, and lifter plates in timed relation to each other and to the conveyor, this drive assembly comprising motor 19, the main drive shaft 20, the conveyor-lifter plate drive shaft 21, and the feeder-pusher operating linkage comprising the cam 22 affixed to main drive shaft 20, the cam rider arm 23 and biasing spring 24 biasing the arm 23 toward the cam 22, the pusher plate actuating lever frame 25 (Fig. 10) having a fixed fulcrum at journals 26 on the machine supporting frame 27, and the feeder plate actuating arm 28 extending to the feeder plate 12 (Figs. 9 and 10) from pusher plate 13.

The arrangement is such that in normal operation during which the conveyor 15 is rotated continuously by the motor 19 through the shafts 20 and 21 and the reduction gear unit 29, a quantity of food may be placed by an operator on the feeder plate 12 whereupon at a predetermined point in the rotation of the cam 22 the linkage of the feeder-pusher operating linkage will be effective first to rotate the feeder plate 12 downward to drop the quantity of food into the chamber 30 in which the pusher plate reciprocates, and thereafter to move the pusher plate 13 leftward as seen in Fig. 9 to push the quantity of food leftward into engagement with the right hand end of the spiral surfaces of the conveyor 15. The space of chamber 30 between the conveyor and the extreme right hand position of pusher plate 13 may be considered as a preheating chamber for the food and the timing relation between the operation of the feeder plate and the pusher is such that the inserted food will float in the oil for a short period before it is engaged by the pusher, that period being sufficiently long to give the food a preliminary searing or preparation of its outer surface so that it will not stick to the pusher, or for that matter, to any other heated metallic parts of the machine. This searing operation is quite important for foods which show a tendency to stick to hot metals if not given a preliminary searing or cauterizing.

The trap door-like action of feeder plate 12 is effected as follows. Plate 12 is so arranged that it will remain in its full line position of Fig. 9 and hold a charge of uncooked food placed on it by an operator until actuated to the dotted position. The mechanism of actuation is as follows: Cut into a lower depending ridge or fin, feeder plate 12 has a groove forming a hook-like catch 31 adapted to be engaged within hole 32 of arm 28 when pusher plate 13 moves to the right. Thereby rightward movement of the pusher plate as seen in Fig. 9 will rotate feeder plate 12 counter-clockwise to its dotted line position to drop any food thereon into chamber 30. Leftward movement of pusher plate 13 then returns the feeder plate to the full line position. By this arrangement the feeder plate opens chamber 30 only long enough to permit one charge of food to enter chamber 30; the operator cannot lower the feeder plate at any other time during the reciprocatory cycle of pusher plate 13 because arm 28 prevents such lowering. Thus, the operator cannot "overfeed" the machine; he may place only limited quantities on feeder plate 12 and these will be introduced into the machine automatically and periodically, and only in timed relation to the reciprocation of pusher plate 13. The capacity of the feeder plate to hold uncooked food is limited such that the operator may not place upon it a food charge large enough to cause a substantial temporary lowering of the oil temperature in the immediate vicinity of the charge when dropped into the oil. So long as there is adequate heat capacity in the heater, any oil temperature loss which does occur will be completely restored by the heater before the next food charge can be introduced regardless of whether the foods as introduced are at room or other temperature.

After the food charge is pushed by pusher plate 13 into the chamber 33 surrounding the conveyor, it is moved by the rotating spiral worm surface of the conveyor at a continuous rate toward the lifter tray 17. During this conveyance or traverse through the heated oil the food is properly cooked; the time in which it remains in the heated oil may be controlled to suit the cooking time requirements of the food at hand by varying the speed motor 19. It will be understood that the speed of the motor will be set by the operator to keep any particular type of food in traverse for such period of time as is required for its proper cooking; some foods require short periods of time others longer periods. Any suitable means, such as electronic controller 34 may be provided to vary the motor speed including a manual speed calibrated dial 35 on the front of the machine (Figs. 1 and 2) which by resistor element 36 controls controller 34.

Upon completion of the traverse of the food through the oil bath, it is lifted by the lifter plate 17 from the oil bath and moved into an output chute 37 and for this purpose the lifter tray may comprise any form such as perforated flat sheet affixed to the shaft of the conveyor 15 so as to rotate synchronously therewith.

The cooperative action between the lifter plate 17 and the output chute 37 is illustrated by the Figures 5 and 6. The chute 37 is mounted for rotation about a suitable support 38 and so weighted that it ordinarily rests on the shaft 39 of the conveyor 15 and plate 17. Since the plate 17 rotates with the conveyor (clockwise as seen from Figure 6) it will periodically engage the chute 37 and rotate it from its full line position to its dotted line position (Fig. 6). It will be understood that in the process, it will scoop food from the oil bath 16 and push it into the chute 37 so long as food is being pushed toward the lifter plate end of the shaft 39 by the conveyor 15. The lifting of the chute 37 to the dotted line position by the lifter plate 17 will serve to complete the ejection of the food from the machine and the cooked food may slide down the chute 37 into any suitable container. The fact that the lifter plate 17 is perforated will minimize the amount of oil scooped up by it and forced into the chute 37. Likewise, oil from the lifted food may be drained back into the bath 16 by the perforations.

As previously indicated it is important to maintain the oil bath at a substantially constant cooking temperature, for example, a temperature from 350° to 375° F. which is found to be adequate for most foods. To this end there are provided the electric heaters 40 which may be of conventional type but of such size that their surface temperature is nowhere substantially above the desired cooking temperature of the oil or at least nowhere above the breakdown temperature of the oil. Thereby the possibility of local burning or breakdown of the oil by contact with highly heated portions of the heater is avoided. It will be understood that by making the heater of sufficient surface area it is possible to keep its operating temperature in the vicinity of or just above the desired oil temperature or at least below the oil breakdown temperature. To maintain the temperature fairly constant, there is provided a thermostat 41 and associated temperature-regulating means 42 connected in circuit with the heaters 40 and with any suitable source of power. These devices may be provided with calibrated manual dial means 43 on the front of the machine for setting the temperature to any desired value within the normal operating range. Preferably, the arrangement is such that it is impossible for the operator to raise the temperature above about 400° F., thereby assuring further against the possibility that the operator will burn the oil.

In order that those skilled in the art may be better able to make use of the invention, further details of the illustrated machine will now be given.

The conveyor 15 together with its shaft 39 and the affixed plate 17 may be mounted for easy quick removal for cleaning by suitable means such as the upwardly-opening U-shaped journals 44 and 45 (Figs. 3 and 9) affixed by suitable cross-bars to the upper horizontal longitudinal members 46 of the main machine supporting frame 27. Thereby, it may be disconnected from the reduction gear system 29 by means of a dismemberable clutch mechanism 47 at one end, and simply lifted out of journals 44 and 45. The structure of the tank which holds the oil bath 16 may comprise the semi-cylindrical member 48 depending from members 46 (Figs. 5 and 6) and thereby removably affixed to the main body of the machine as by bolts 49. The heater coils 40 are suitably affixed in member 48 and extend along its lower surface (Figs. 5, 6 and 9). A suitable quarter cylindrical protecting guard 50 partially covering the mechanisms within the oil bath may also be provided. In order to insure that all food particles are kept from contact with the heater, a suitable perforated semi-cylindrical shield 51 also depending from members 46 (see particularly Figs. 5, 6 and 9) may also be provided, this shield having a radius approximately the same as the outer radius of both the conveyor 15 and the plate 17. Shield 51 along with the member 48 and guard 50 may be readily removed for cleaning by detachment of the bolts 49. The feeder plate 12 may be surrounded by a suitable box-like enclosure member 52 to form an open-top receptacle for uncooked food which the operator may wish inserted into the machine by feeder plate 12 in the manner previously described.

It will be seen that the pusher plate mechanisms comprise, as best visualized from Figs. 9 and 10, a semi-circular perforated plate 13 having at its outer ends the hook-like brackets 53 which rest in slots 54 on the arms 55 of the frame 25. The member 28 for actuating the feeder plate through its groove 31 is shown in the Figure 10 as suitably affixed to the U-shaped bracket 56 which in turn is affixed to the pusher plate 1[illegible]

Any suitable oil-draining mechanism 57 (Figs. 2 and 3) having the valve 58 may be provided for draining oil from the oil bath.

Figure 3:
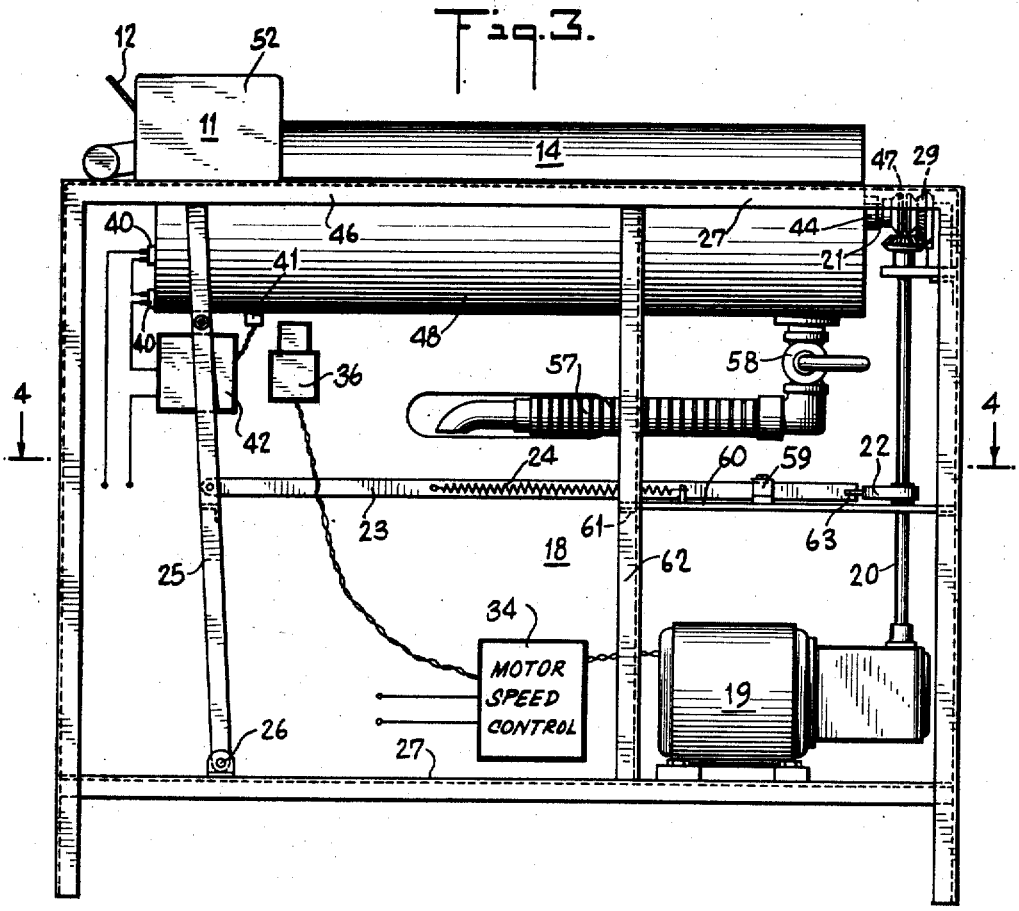
Figure 4:
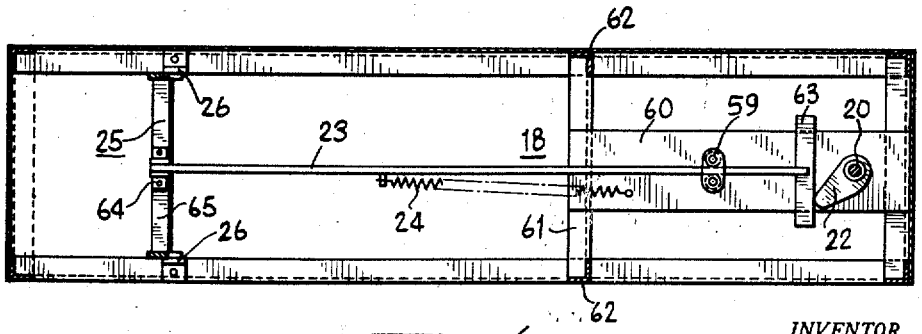
Fig. 4 is a horizontal section along line 4—4 of Fig. 3.

As seen in Figs. 3 and 4, arm 23 slides in bracket 59 affixed to shelf 60 which is affixed to main machine supporting frame 27 by the latter's cross bars 61 and 62. Cam rider 63 is affixed to arm 23 at one end, and arm 23 is journaled to frame 25 at bracket 64 on cross bar 65 of frame 25, spring 24 is affixed to shelf 60 at its one end and to arm 24 at the other and is under tension to pull arm 23 and the pusher plate 13 toward conveyor 15.

It is to be noted that the foregoing provides safety features to meet the possibility that the operator may inadvertently place an obstacle, such as his hand, in the path of the feeder plate while the latter is returning to the closed or horizontal (full line) position. In that event, the obstacle is squeezed only to the extent of the tension of spring 24 which tension may be made small enough to preclude the possibility of injury. The same safety action may, if desired, be provided when the feeder plate is dropping to its open (dotted line) position by interposing a suitable spring safety device somewhere between the cam mechanism and feeder plate so that the push of the cam is transmitted not directly through unyielding mechanical elements, as shown, but rather through spring means yielding to pressures created by obstacles such as the operator's hand in the path of the dropping feeder plate.

In normal operation, it is preferable that the synchronization of the machine elements thus described be such that the pusher plate 13 will begin to move food in the chamber 30 into the chamber 33 of the conveyor 15 at approximately the time when the leading edge 66 of the conveyor 15 is horizontal and proceeding downward, it being assumed that in the Fig. 9, the leading edge is rotating away from the observer.

It has been observed that in machines of the character described, common foods (e. g. whole or cut potatoes, fish, meats, etc.) are cooked or fried in substantially shorter time than with conventional methods such as the common method of immersing basket loads into heated oil. For example, a cooking time as short as a fraction of a minute to five minutes has been found to produce a cooked product of superior taste for each of these foods, which time is far too short for conventional domestic or basket-immersion frying methods.

While the reason for these faster results is not certain, it is thought to be due to several novel aspects of the method. First, the sudden complete immersion of each piece of food into the hot oil as it drops from the feeder plate 12 into chamber 30 appears to sear or cauterize its surface, thereby coagulating the surface or closing its pores to seal in the internal moisture of the food and minimize oil absorption. Apparently, internal steam-pressure cooking can, therefore, take place more readily and more quickly. The effect is enhanced by the fact that substantial oil temperature drop is avoided by preventing the introduction of large food loads, as pointed out elsewhere. Second, the food thereafter is permitted to rest in the oil throughout its passage through the machine in a suspended or submerged condition substantially just below the surface, neither sinking as heavy foods such as nuts, nor floating with substantial portions above the surface as the light doughnuts. Thirdly, the constant gentle agitation by the conveyor worm as the food particles are conveyed along apparently permits better and more uniform thermal exchange over the entire surface of the food particles besides permitting a certain amount of oxidation as each food surface portion is occasionally brought to the oil surface to contact the air at the oil surface. This agitation also prevents the sticking together of adjacent pieces of food, thereby avoiding mutual coverage of adhering surfaces which would interfere with that transfer. It is believed that these factors account for the quickness and uniformity of cooking and that foods have not previously been cooked by this method.

It has been an observed fact that machines embodying the invention produce fried food products, such as whole or cut potatoes, fish and meat, of superior taste and substantially more free of cooking oil than those produced by conventional frying methods.

It will thus be seen that there has been provided a simple machine readily adaptable for restaurant or institutional usage for the preparation of food either at a continuously high rate or in occasional batches as the demand requires.

An operator need only set the required cooking time and temperature for the particular food at hand by adjusting the motor speed and the thermostat, and thereafter place a quantity of the uncooked food on the feeder plate 12. Thereafter, the machine will perform without further attention the required operations automatically and uniformly, thereby obviating timing and temperature variations attributable in conventional practice to operator unskillfulness or lack of attention. The temperature and timing are automatically maintained. Because food is ordinarily introduced only by actuation of the feeder plate 12, the operator cannot lower the temperature momentarily by the sudden introduction of large relatively cold food batches as in conventional practice wherein the temporary drop in oil temperature below cooking temperature in the immediate vicinity of the food permits the food undesirably to absorb oil during the period of the diminished temperature; nor can he raise the temperature to the burning point. Sticking of the food to the metallic parts, such as the pusher plate or the conveyor, is minimized by the preliminary searing in the preheating chamber 30, as already indicated. Because of the open nature of the housing around the conveyor, it will be possible to introduce some foods at points advanced along the path of conveyance. Such might be desirable where it is desired to cook simultaneously different foods, one of which requires lesser cooking time. Moreover, the conveyor worm tends to separate the food into compartments, making it possible to prepare different foods simultaneously in the oil bath as by introducing the different foods successively to the feeder plate.

What is claimed is:

1. In combination in *an immersion oil* [a] cooking machine *for a batch of submergible food*, a container defining a cooking chamber and a searing chamber contiguous therewith, said chambers having therein a quantity of cooking oil through which food may be passed for cooking thereof, a *helicoid* conveyor in said cooking chamber for *simultaneously agitating and* conveying said food *batch in a submerged condition* through said oil from one end to the other of a path in said cooking chamber, a pusher in said searing chamber for pushing food *submerged in said oil* from said searing chamber into said cooking chamber for engagement with said conveyor at said one end of said path, *said pusher being positioned initially at one side of said searing chamber out of contact with said food batch*, a lifter *on the shaft of and rotatable with said conveyor* adjacent the other end of said path for lifting said *submerged* food from said oil upon completion of its conveyance, and means for operating said conveyor, said pusher and said lifter in predetermined timed relation such that said pusher is periodically operated to *engage and* push said food to said conveyor *after an interval of time in which said food in said searing chamber is sufficiently cauterized substantially to prevent sticking thereof to said pusher and said conveyor* [as aforesaid], and said lifter removes said food from said oil upon completion of its conveyance.

2. In combination in *an immersion oil* [a] cooking machine *for a batch of submergible food*, a container defining a cooking chamber and a searing chamber contiguous therewith, said chambers being adapted to hold a quantity of cooking oil through which food may be passed for cooking thereof, a *helicoid* conveyor in said cooking chamber for *simultaneously agitating and* conveying said food *batch in a submerged condition* through said oil from one end to the other of a path in said cooking chamber, a pusher in said searing chamber for pushing food *submerged in said oil* from said searing chamber into said cooking chamber for engagement with said conveyor at said one end of said path, *said pusher being positioned initially at one side of said searing chamber out of contact with said food batch* a feeder for periodically supplying food to said searing chamber for pushing by said pusher, a lifter *on the shaft of and rotatable with said conveyor* adjacent the other end of said path for lifting said food from said oil upon completion of its conveyance, and means for operating said conveyor, said pusher, said feeder, and said lifter in predetermined timed relation such that said feeder is periodically operated to supply food to said searing chamber, as aforesaid, said pusher is periodically operated to *engage and* push said food to said conveyor [as aforesaid] after elapse of a predetermined time from the operation of said feeder *sufficient to effect cauterization of said food to prevent sticking thereof to said pusher and said conveyor*, and said lifter removes said food from said oil upon completion of its conveyance.

3. In combination in *an immersion oil* [a] cooking machine *for a batch of submergible food*, a [conveyor] trough *defining a cooking chamber and a searing chamber* adapted to hold a quantity of cooking oil through which food may be conveyed for cooking thereof, a helicoid conveyor and shaft therefor rotatable in said oil *in said cooking chamber* for *simultaneously agitating and* conveying said food *in a submerged condition* through said oil from one end of said conveyor to the other, a reciprocatable pusher *in said searing chamber* adjacent said one end for pushing food into [the] engagement with said conveyor, *said pusher being positioned initially at one side of said searing chamber out of contact with a food batch fed therein*, a lifter on the shaft of and rotatable with said conveyor at the other end of said conveyor for *scooping and* lifting said food from said oil upon completion of its conveyance, and means for operating said conveyor, said pusher and said lifter in predetermined timed relation such that said pusher is periodically operated to *engage and* push said food to said conveyor *after an interval of time in which said food in said searing chamber is sufficiently cauterized to Prevent sticking thereof to said pusher and conveyor* and said lifter removes said food from said oil upon completion of its conveyance comprising a motor, means interconnecting said motor and conveyor shaft in driving relationship, a rotatable lever arm for actuating said pusher, and means interconnecting said motor and lever arm actuable periodically by said motor to reciprocate said lever arm and pusher.

4. In combination in a cooking machine, a semicylindrical container adapted to hold a quantity of cooking oil through which food may be conveyed for cooking thereof, a helicoid conveyor and driving shaft therefor rotatable coaxially within said container in said oil for conveying said food through said oil from one end of said container to the other, a reciprocatable pusher in said container adjacent said one end for pushing food into the engagement with said conveyor, a lifter *mounted* on the shaft *and extending laterally therefrom, said lifter being* [of and] rotatable with said conveyor at the other end of said container for lifting said food from said oil upon completion of its conveyance, a chute *extending into said container and pivotally mounted* [affixed to said container] adjacent said *shaft* [lifter] for receiving food lifted by said lifter, said chute being periodically engaged and rotated by said lifter, and means for operating said conveyor, said pusher and said lifter in predetermined timed relation such that said pusher is periodically operated to push said food to said conveyor and said lifter removes said food from said oil upon completion of its conveyance and delivers it to said chute.

5. In combination in an *immersion oil* [a] cooking machine *for a batch of summergible food,* a [conveyor] trough *defining a cooking chamber and a searing chamber* adapted to hold a quantity of cooking oil through which food may be conveyed for cooking thereof, a helicoid conveyor and shaft therefor rotatable in said oil *in said cooking chamber* for *simultaneously agitating and* conveying said food *in a submerged condition* through said oil from one end of said conveyor to the other, a reciprocatable pusher *in said searing chamber* adjacent said one end for pushing food into [the] engagement with said conveyor, *said pusher being positioned initially at one side of said searing chamber out of contact with the food batch fed therein,* a feeder for supplying food to said pusher, a lifter on the shaft of and rotatable with said conveyor at the other end of said conveyor for lifting *and scooping* said food from said oil upon completion of its conveyance, and means for operating said conveyor, said pusher, said feeder and said lifter in predetermined timed relation such that said pusher is periodically operated to *engage and* push said food to said conveyor *after an interval of time in which said food in said searing chamber is sufficiently cauterized to prevent sticking thereof to said pusher and said conveyor,* said feeder is periodically operated to feed said food to said pusher, and said lifter removes said food from said oil upon completion of its conveyance comprising a motor, means interconnecting said motor and conveyor shaft in driving relationship, a rotatable lever arm for actuating said pusher, means interconnecting said motor and lever arm actuable periodically by said motor to reciprocate said lever arm and pusher, and means interconnecting with and actuated by said last mentioned means for periodically actuating said feeder.

6. In combination in a cooking machine, a semicylindrical container adapted to hold a quantity of cooking oil through which food may be conveyed for cooking thereof, a helicoid conveyor and driving shaft therefor rotatable coaxially within said container in said oil for conveying said food through said oil from one end of said container to the other, a reciprocatable pusher in said container adjacent said one end for pushing food into the engagement with said conveyor, a periodically operable feeder chute for periodically dropping food to said pusher, a lifter *mounted* on the shaft [of] and *extending laterally therefrom, said lifter being* rotatable with said conveyor at the other end of said container for lifting said food from said oil upon completion of its conveyance, a delivery chute *extending into said container and pivotally mounted* [affixed to said container] adjacent said *shaft* [lifter] for receiving food lifted by said lifter, said delivery chute being periodically engaged and rotated by said lifter, and means for operating said conveyor, said pusher, said feeder chute and said lifter in predetermined timed relation such that said pusher is periodically operated to push said food to said conveyor, said feeder chute is periodically operated to drop said food to said pusher, and said lifter removes said food from said oil upon completion of its conveyance and delivers it to said delivery chute.

7. In combination in *an immersion oil* [a] cooking machine *for a batch of submergible food,* a container defining a cooking chamber and a searing chamber contiguous therewith, said chambers being adapted to hold a quantity of cooking oil through which food may be passed for cooking thereof, a helicoid conveyor and shaft therefor rotatable in said cooking chamber in said oil for *simultaneously agitating and* conveying said food *in a submerged condition* through said oil from one end to the other of a path in said cooking chamber, a reciprocatable pusher in said searing chamber for pushing food *submerged in said oil* from said searing chamber into said cooking chamber into engagement with said conveyor at said one end of said path, *said pusher being initially positioned at one side of said searing chamber out of contact with said food batch,* a feeder for periodically supplying *a* food *batch* to said searing chamber for pushing by said pusher, a lifter on the shaft of and rotatable with said conveyor adjacent the other end of said path for *scooping and* lifting said food from said oil upon completion of its conveyance, and means for operating said conveyor, said pusher, said feeder and said lifter in predetermined timed relation such that said pusher is periodically operated to *engage and* push said food to said conveyor *after an interval of time sufficient to effect cauterization of said food to prevent sticking thereof to said pusher and said conveyor,* said feeder is periodically operated to feed said food to said searing chamber, and said lifter removes said food from said oil upon completion of its conveyance comprising a motor, means interconnecting said motor and conveyor shaft in driving relationship, a rotatable lever arm for actuating said pusher, means interconnecting said motor and lever arm actuable periodically by said motor to reciprocate said lever arm and pusher, and means interconnecting with and actuated by said last mentioned means for periodically actuating said feeder.

8. In combination in a cooking machine, a container defining a cooking chamber and a searing chamber contiguous therewith, said chambers being adapted to hold a quantity of cooking oil through which food may be passed for cooking thereof, a helicoid conveyor and shaft therefor rotatable in said cooking chamber in said oil for conveying said food through said oil from one end to the other of a path in said cooking chamber, a reciprocatable pusher in said searing chamber for pushing food from said searing chamber into said cooking chamber into engagement with said conveyor at said one end of said path, a feeder for dropping food to said searing chamber by said pusher, a *perforated* lifter *plate mounted tangentially* on the shaft of and rotatable with said conveyor adjacent the other end of said path for lifting said food from said oil upon completion of its conveyance, a delivery chute *pivotally mounted* adjacent said *shaft, said chute extending into said cooking chamber and being weighted to rest on said shaft* [lifter] for receiving food lifted by said lifter plate, said delivery chute being periodically engaged and rotated by said lifter plate, and means for operating said conveyor, said pusher, said feeder and said lifter in predetermined timed relation such that said pusher is periodically operated to push said food to said conveyor, said feeder is periodically operated to drop said food to said searing chamber, and said lifter removes said food from said oil upon completion of its conveyance and delivers it to said delivery chute comprising a motor, means interconnecting said motor and conveyor shaft in driving relationship, a rotatable lever arm for actuating said pusher, means interconnecting said motor and lever arm actuable periodically by said motor to reciprocate said lever arm and pusher, and means interconnecting with and actuated by said last mentioned means for periodically actuating said feeder.

*9. In a cooking machine, a container defining a cooking chamber adapted to hold a quantity of cooking oil through which food may be passed for cooking thereof, a helicoid conveyor and shaft therefor rotatable in said cooking chamber in said oil for conveying said food through said oil from one end to the other of a path in said cooking chamber, a lifter mounted on the shaft and extending laterally therefrom, said lifter being rotatable with said conveyor adjacent the other end of said path for lifting said food from said oil upon completion of its conveyance, a delivery chute extending into said chamber and pivotally mounted adjacent said lifter for receiving food lifted by said lifter, said delivery chute being periodically engaged and rotated by said lifter, and means for operating said conveyor including a motor and means interconnecting said motor and conveyor shaft in driving relationship.*

*10. In combination in a cooking machine, a container defining a cooking chamber adapted to hold a quantity of cooking oil through which food may be passed for cooking thereof, a helicoid conveyor and shaft therefor rotatable in said cooking chamber in said oil for conveying said food through said oil from one end to the other of a path in said cooking chamber, means to feed a charge of uncooked food into engagement with said conveyor for passage through said cooking oil, a lifter mounted on the shaft and extending laterally therefrom, said lifter being rotatable with said conveyor adjacent the other end of said path for lifting said food from said oil upon completion of its conveyance, a delivery chute extending into said chamber and pivotally mounted adjacent said lifter for receiving food lifted by said lifter, said delivery chute being periodically engaged and rotated by said lifter, and means for operating said conveyor including a motor and means interconnecting said motor and conveyor shaft in driving relationship.*

*11. In combination in a cooking machine, a*

*container defining a cooking chamber adapted to hold a quantity of cooking oil through which food may be passed for cooking thereof, a helicoid conveyor and shaft therefor rotatable in said cooking chamber in said oil for conveying said food through said oil from one end to the other of a path in said cooking chamber, means to feed a charge of uncooked food into engagement with said conveyor for passage through said cooking oil, a perforated lifter plate mounted tangentially on the shaft of and rotatable with said conveyor adjacent the other end of said path for lifting said food from said oil upon completion of its conveyance, said oil being drained from the lifted food by the perforations in said plate, a delivery chute pivotally mounted adjacent said shaft, said chute extending into said chamber and being weighted to rest on said shaft, said chute being periodically engaged and rotated by said lifter plate to receive the food from said plate and to slide said food downwardly, and means for operating said conveyor including a motor, a means interconnecting said motor and conveyor shaft in driving relationship.*

*12. In a cooking machine, a cooking chamber adapted to hold a quantity of cooking oil, a helicoid conveyor and shaft therefor rotatable in said chamber in said oil for conveying food through said oil in a path in said chamber, a perforated lifter plate mounted substantially tangentially on the shaft of and rotatable with said conveyor adjacent on end of said path for lifting said food from said oil upon completion of its conveyance, said oil being drained from the lifted food by the perforations in said plate and a delivery chute pivotally mounted adjacent said shaft, said chute extending into said chamber to rest on said shaft to be engaged and rotated periodically by said lifter plate, whereby said chute receives said food and slides same downwardly, and means to rotate said shaft.*

References Cited in the file of this patent or the original patent

UNITED STATES PATENTS

| Number | Name | Date |
|---|---|---|
| 1,301,997 | Becker | Apr. 29, 1919 |
| 1,333,389 | Comb et al. | Mar. 9, 1920 |
| 1,605,203 | Baxter | Nov. 2, 1926 |
| 1,736,565 | Woodcock | Nov. 19, 1929 |
| 1,906,395 | Meeks | May 2, 1933 |
| 1,991,492 | Carpenter | Feb. 19, 1935 |
| 2,018,419 | Richeson | Oct. 22, 1935 |
| 2,041,175 | Goodman | May 19, 1936 |
| 2,067,849 | Hunter | Jan. 12, 1937 |
| 2,201,364 | Carpenter | May 21, 1940 |
| 2,418,519 | McBeth | Apr. 8, 1947 |
| 2,456,124 | Hoffman | Dec. 14, 1948 |
| 2,538,937 | Foster | Jan. 23, 1951 |